Nov. 10, 1931.  J. H. ASHBAUGH ET AL  1,830,975
REGULATOR SYSTEM
Filed Jan. 23, 1930
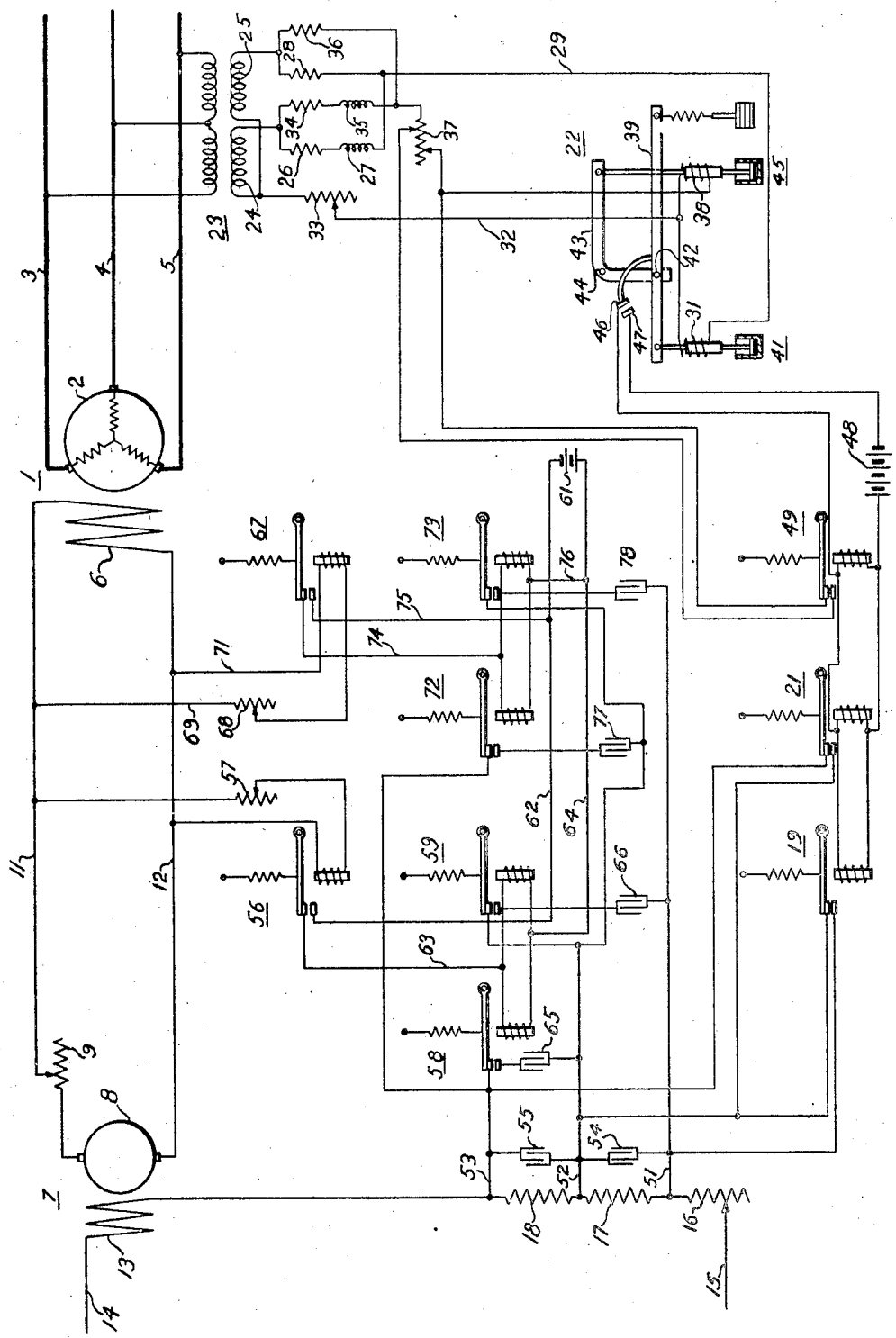
INVENTOR
John H. Ashbaugh &
Homer C. Nycum
BY
ATTORNEY Patented Nov. 10, 1931

1,830,975

UNITED STATES PATENT OFFICE

JOHN H. ASHBAUGH, OF PITTSBURGH, AND HOMER C. NYCUM, OF WILKINSBURG, PENN-SYLVANIA, ASSIGNORS TO WESTINGHOUSE ELECTRIC AND MANUFACTURING COMPANY, A CORPORATION OF PENNSYLVANIA

REGULATOR SYSTEM

Application filed January 23, 1930. Serial No. 422,794.

Our invention relates to regulator systems and more particularly to a regulator system of the vibrating type wherein means is provided to prevent flash-over of the contact-making relays when operating at high current values.

In regulators of the vibrating type, that are utilized for governing the excitation of dynamo-electric machines, such as generators or motors, a plurality of resistor sections is provided in series with the field windings of the regulated machine, and short circuiting relays are provided, associated with the several resistor sections or elements for intermittently short-circuiting them, or portions thereof, to vary their effective values. These relays are actuated in accordance with the operation of a regulator energized from the power circuit in accordance with the voltage, or other characteristic, of the power circuit that it is desired to regulate.

The effective value of resistance in series with the field winding is determined by the percent of time that the shunting relay contact members are in engagement. Upon an increase in the percent of time that the relay contact members are in engagement, the effective value of the resistor elements will be reduced, and the field current will be correspondingly increased.

In order to absorb or dissipate the energy in the field circuit upon engagement of the relay contact members, condensers may be provided, connected in shunt relation to the resistor elements. If the capacities of these condensers are of such values as to be most effective, under the normal range of operating values of the regulating resistor, they will not have sufficient capacity to dissipate the required energy when the effective value of the resistor is very low and the field currents correspondingly high above its normal value.

An object of our invention is to provide means for increasing the energy-dissipating capacity of the condensers connected in parallel-circuit relation to the current-controlling resistors in the field circuit of a dynamo-electric machine.

Our invention is illustrated and described as applied to a regulator system for governing the excitation of a generator connected to a power circuit wherein it is desired to maintain the voltage thereof substantially constant.

Our invention will be better understood by reference to the accompanying drawing, in which the single figure is a diagrammatic view of circuits and apparatus comprising one embodiment of our invention.

Referring to the drawing, an alternating-current generator 1 is provided having an armature winding 2 that is connected to the power-circuit conductors 3, 4 and 5, and with a field winding 6. An exciter generator 7 is provided comprising an armature winding 8 that is connected, through an adjusting resistor 9 and by means of conductors 11 and 12, to the field winding 6, and a field winding 13 that is connected to be energized from the supply conductors 14 and 15. In circuit with the field winding 13, an adjusting resistor 16 and regulating resistors 17 and 18 are provided. The field winding 13 may be divided and connected in parallel circuits in a well known manner, in which case, each circuit will be provided with regulating resistors controlled by the regulator system in the same manner as the resistors 17 and 18.

The effective value of the regulating resistors 17 and 18 is controlled by the relays 19 and 21 that are operated in accordance with the operation of the regulator 22, which is energized through the positive phase-sequence network 23 in accordance with the voltage of the power circuit 3, 4, 5.

The positive phase-sequence network 23 comprises two voltage transformers connected in open delta to the transmission line 3, 4, 5. The two secondary windings 24 and 25 of the voltage transformers are connected in such manner as to develop voltages that are 120 electrical degrees phase displacement from each other and are connected together at a common point. The opposite end of the winding 24 is connected through a resistor 26 and an impedance 27, and the opposite end of the winding 25 is connected through a resistor 28, these two circuits being joined in the conductor 29, leading through the regulating winding 31 and, by a conductor 32 and an adjusting resistor 33, to the common point of connection of the windings 24 and 25. Similar circuits lead from the winding 24 through resistor 34 and an impedance 35, and from the winding 25 through the resistor 36 to a common point, thence through the regulating resistor 37 and the regulator winding 38, and, by a conductor 32, to the common point of the win lings 24 and 25. The desirable values of the resistor and impedance elements in the phase-sequence network is pointed out in Patent No. 1,571,224, of February 2, 1926 to C. T. Allcutt and assigned to the Westinghouse Electric and Manufacturing Company.

The regulator 22 comprises a lever 39 that is actuated by the electromagnet 41 and is supported on the pivot 42 carried by the lower end of the bell-crank lever 43 which is, in turn, mounted on the pivot 44 and actuated by the electromagnet 45. The lever 39 carries a movable contact member 46 which is actuated by the regulator to engage and disengage a fixed contact member 47, thus closing a circuit from the battery 48 to operate the relays 19, 21 and 49. The relays 19 and 21, when energized, close circuits in shunt relation to the resistors 17 and 18, respectively, thereby controlling the effective value of these resistors, and the relay 49, when energized, closes a circuit in shunt relation to a portion of the resistor 37 that is connected in circuit with the regulator winding 38, thus increasing the energization of this regulator winding and causing the core of the electromagnet 45 to move upwardly, thus moving the contact member 46 toward the right and out of engagement with the contact member 47.

Conductors 51, 52 and 53 are provided, by means of which a condenser 54 is connected, in parallel-circuit relation to the resistor 17, and a condenser 55 is connected in parallel-circuit relation to the resistor 18. These condensers provide means for discharging current which would otherwise cause an arc across the contact members of the relays 19 and 21 upon their disengagement.

In order to provide further condenser capacity which will become effective to absorb heavy currents through the regulator relay contact members, condensers are provided which are connected across the resistor elements, in a manner to be described, upon the operation of the relays 56 and 67.

The relay 56 is connected between the conductors 11 and 12 in circuit with an adjusting resistor 57 which is so adjusted that, when the voltage across the conductors 11 and 12 rises to some predetermined value, which will be higher than the voltage normally impressed upon the field winding 6, the relay 56 will then close a circuit through its contact members, thus energizing relays 58 and 59 from the battery 61. This circuit may be traced from the battery 61 by conductor 62 to the contact members of the relay 56, by conductor 63, the windings of the relays 58 and 59 and conductor 64 to the battery 61. The relay 58, when energized, closes a circuit between conductors 53 and 52, through the condenser 65 in shunt relation to the resistor 18, and the relay 59 closes a circuit between conductors 52 and 51 through the condenser 66 in shunt relation to the resistor 17.

The relay 67 is similar to the relay 56 and is connected between the conductors 11 and 12 by means of the conductor 69, the adjustable resistor 68 and conductor 71 to be energized in accordance with the voltage impressed across the field winding 6 of the main generator. This relay may be adjusted to close a circuit through the contact members thereof upon a predetermined voltage across the field winding 6 which may be higher than that required to close a circuit through the relay 56.

The relay 67, when energized, closes a circuit for operating the relays 72 and 73 to their circuit-closing positions by a circuit from the battery 61, through conductor 75, contact members of relay 67, conductor 74, the windings of the relays 72 and 73 and conductor 76, to the battery 61. The relay 72, upon engagement of its contact members, closes a circuit between the conductors 52 and 53 through the condenser 77 in shunt relation to the resistor 18, and the relay 73, upon engagement of its contact members, closes a circuit from the conductors 51 and 52 through the condenser 78 in shunt relation to the resistor 17.

The operation of the regulator system is described as follows: The windings 31 and 38 of the regulator 22 are energized in accordance with the positive phase-sequence voltage component of the power circuit 3, 4, 5 through the network 23. The angular position of the lever 39 is such as to move the contact member 46 in a counter-clockwise direction about the pivot 42 upon a decrease in the voltage of the power circuit, the core of the magnet 41 moving downwardly. This causes an engagement of the contact members 46 and 47 and the energization of the relays 19, 21 and 49 to their circuit-closing positions. The relays 19 and 21 operate, as explained above, to vary the effective value of the resistors 17 and 18, and the relay 49 operates to increase the energization of the winding 38, thus causing disengagement of the contact members 46 and 47, which are caused to engage and be disengaged intermittently.

The energization of the winding 31 controls the position of the contact member 46 relative to that of the pivot 42, thus varying the percent of time that the contact members 46 and 47 are in engagement. As the required energization of the main machine increases, the position of the core of the magnet 41 is lowered, and the percent of time of engagement of contact members 46 and 47 is correspondingly increased, thus increasing the percent time during which the relays 19 and 21 short circuit the resistors 17 and 18, thus decreasing the effective value of the resistors and increasing the current in the field winding 13.

Should the machine 1 require an excitation in excess of that required under its normal voltage and load conditions, the regulator 22 would maintain the contact members 46 and 47 in engagement for a larger percent of time and the relays 19 and 21 would short circuit the resistors 17 and 18 for a corresponding larger percent of time, thus increasing the excitation of the exciter generator 7 and forcing the voltage thereof higher. Upon a predetermined voltage between the conductors 11 and 12, the relay 56 will close a circuit through its contact members, as explained above, causing the condensers 65 and 66 to be connected in parallel with the resistors 18 and 17, respectively, thus providing means to absorb the increased current that would otherwise flow between the contact members of the relays 19 and 21 upon their separation and form an arc.

Should the voltage between the conductors 11 and 12 continue to rise, the relay 67 would operate to cause the condensers 77 and 78 to be connected in parallel relation to the resistors 18 and 17, respectively, thus providing further means for absorbing energy upon the separation of the contact members of the relays 19 and 21. Thus, as the required current through the circuit of the field winding 13 is increased, additional condensers are connected in parallel-circuit relation to the regulating resistors, and, together with the condensers 55 and 54, eliminate sparking between the contact members of the relays controlling the effective values of these resistors.

When the need for a high excitation has passed, the regulator 22 lowers the voltage of the excitator generator, and the relays 67 and 56 operate in the reverse order to disconnect first the condensers 77 and 78, and then the condensers 65 and 66, from the resistors 18 and 17, respectively.

Since many modifications may be made in the apparatus and circuits described without departing from the spirit of my invention, we do not wish to be limited otherwise than by the scope of the appended claims.

We claim as our invention:

1. In a regulator system, a dynamo-electric machine comprising a field winding, a plurality of resistor elements connected in circuit with said field winding, relays associated with said resistor elements for varying the effective value thereof in the field-winding circuit, condensers connected in parallel-circuit relation to said resistors, additional condensers and means actuated in accordance with a predetermined excitation of said dynamo-electric machine for connecting said additional condensers in parallel-circuit relation to said resistor elements.

2. In a regulator system, a dynamo-electric machine comprising a field winding, a plurality of resistor elements connected in circuit with said field winding, relays associated with said resistor elements for closing circuits in shunt relation thereto for varying the current in said field winding, means connected to said resistors for absorbing the energy stored therein upon closing the circuits through said relays, and means effective upon a predetermined increase in the energization of said field winding for absorbing a greater amount of energy from said resistor elements.

3. In a regulator system, a dynamo-electric machine comprising a field winding, a resistor element in circuit with said field winding, a relay associated with said resistor for varying the effective value thereof, and regulator means actuated in accordance with an electrical quantity of said dynamo-electric machine for intermittently opening and closing a circuit through said relay, means connected between the contact members of said relay for dissipating energy, additional energy-dissipating means, and means for automatically connecting said additional energy-dissipating means between the contact members of said relay upon a predetermined excitation of said dynamo-electric machine.

4. In a regulator system, a dynamo-electric machine comprising a field winding, a a resistor element in circuit with said field winding, a relay associated with said resistor for varying the effective value thereof, and regulator means actuated in accordance with an electrical quantity of said dynamo-electric machine for intermittently opening and closing a circuit through said relay, means connected between the contact members of said relay for dissipating energy, and means actuated in accordance with the excitation of said dynamo-electric machine for varying the capacity of the energy-dissipating means connected between the contact members of said relay.

In testimony whereof, we have hereunto subscribed our names this 14th day of January, 1930.

JOHN H. ASHBAUGH.
HOMER C. NYCUM.